RUFUS B. CHAPMAN.
Improvement in Sealing Dip Pipes of Gas Apparatus.
Reissued March 12, 1872.
No. 4,797.
*Fig. 1*
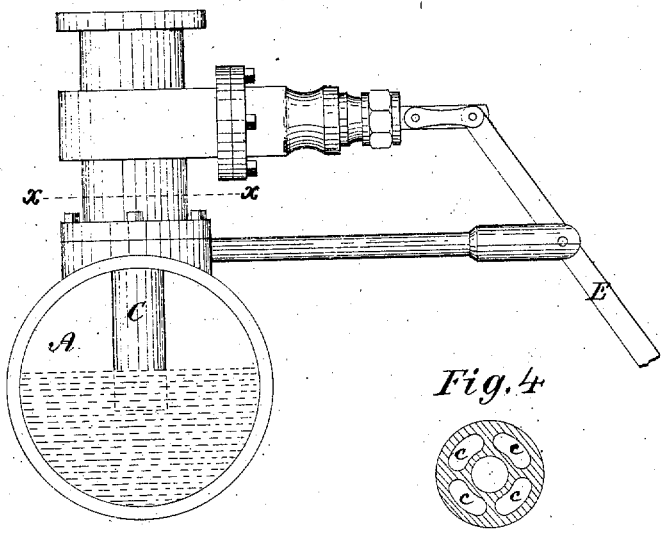
*Fig. 4*
*Fig. 2*
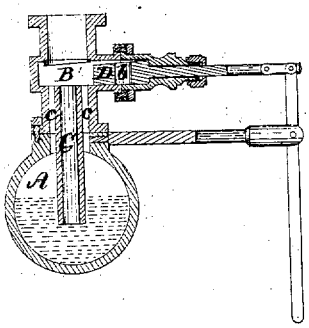
*Fig. 3*
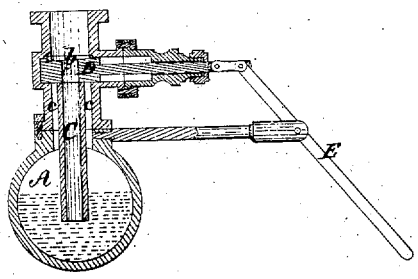
Rufus B. Chapman
Inventor.
Witnesses { J. Austin Fitz
J. Henry Taylor.

UNITED STATES PATENT OFFICE.

RUFUS B. CHAPMAN, OF WALTHAM, MASSACHUSETTS, ASSIGNOR, BY MESNE ASSIGNMENTS, TO JOHN C. CHAPMAN, FREDERICK J. DAVIS, AND JOHN F. FARNUM.

IMPROVEMENT IN SEALING DIP-PIPES OF GAS APPARATUS.

Specification forming part of Letters Patent No. 117,602, dated August 1, 1871; reissue No. 4,797, dated March 12, 1872.

*To all whom it may concern:*

Be it known that I, RUFUS B. CHAPMAN, of Waltham, in the county of Middlesex and State of Massachusetts, have invented certain Improvements in Apparatus for the Manufacture of Coal-Gas, of which the following is a full, clear, and exact description, reference being had to the accompanying drawing making part of this specification, in which—

Figure 1 is an end elevation of the hydraulic main of a gas apparatus with my improvements applied thereto. Fig. 2 is a section through the same with the valve (to be presently described) open. Fig. 3 is a section through the same with the valve closed. Fig. 4 is a section on the line *x x* of Fig. 1.

My invention relates to the combination of a valve and a "dip-pipe" in apparatus for the manufacture of coal-gas, whereby, when the valve is open, the gas is permitted to pass freely and without pressure to the hydraulic main, and when such free passage is required to be closed by closing the valve, the dangerous consequences of inadvertently allowing it to remain closed while the production of gas is going on are prevented by the gas being allowed to pass under pressure from the retort through the dip-pipe, and the water which seals the outlet of that pipe, into the hydraulic main in the ordinary manner.

Gas apparatus have been constructed in which dip-pipes have been dispensed with, and the retorts operated without pressure—that is to say, so that the gas passed off from the retort without pressure, and only so—by the introduction of a valve at some convenient point between the retort and the hydraulic main. An example of such arrangement is shown in the patent of William Gibson, October 5, 1869; but such an apparatus is liable to accident in the event of neglect in opening the valve.

To overcome this objection gas apparatus have also been constructed in which, in addition to the ordinary dip-pipe, through which and through the sealing water the gas passed from the retort under pressure, (and only so,) a supplemental pipe has been added having a valve or cut-off, so that when the valve was open the gas would pass freely and without pressure to the hydraulic main, and when the valve was closed the gas would pass under pressure through the dip-pipe and sealing water to the hydraulic main. This arrangement (an example of which is found in the patent of Edward Jones, June 27, 1871) prevents accident from explosion incident to neglect to open the valve at the proper time; but it is objectionable as not being adapted to gas apparatus already in use, and is liable to become fouled, and the valve has to be removed for cleansing, while my device is more simple, is cheaply applied to gas apparatus already in use, and the sliding valve removes the tar and sediment from the passages, and automatically the apparatus keeps itself in working order.

To enable others skilled in the art to understand and use my invention, I will proceed to describe the manner in which I have carried it out.

In the said drawing, A represents the hydraulic main of a gas apparatus, to the top of which is secured a valve, B, to which the "bridge-pipe" leading from the retort is intended to be attached. C is a dip-pipe, which extends up into the interior of the valve, and forms a part thereof, the lower end of the pipe C descending into the liquid contents of the main, so as to form a "dip-seal." D is a sliding plug, which is operated by the lever E, and is provided with an aperture, *b*, which, when the valve is closed, as seen in Fig. 3, lies over the end of the dip-pipe and opens a communication between it and the retort. Within the shell of the valve and around the exterior of the dip-pipe is formed a series of passages, *c*, which open into the hydraulic main, and when the valve is closed these passages are tightly covered by the plug D, as seen in Fig. 3.

The charge may now be drawn from the retort, as the communication between it and the hydraulic main A, through the passages *c*, is effectually cut off, and the gas cannot flow back to the retort through the dip-pipe, as its lower end is sealed in the liquid contents of the main. As soon as the retort has been charged the plug D is withdrawn by means of the lever E, when the gas will flow freely and without pressure through the passages *c* into the hydraulic main A. Should the valve, however, be allowed to remain closed through the negligence of the person in charge during the production of the gas, it will pass under pressure through the aperture *b* in the plug D to the dip-pipe C, and thence into the hydraulic main in the ordinary manner, thus effectually preventing any possibility of explosion or accident.

The above-described combined valve and dip-pipe is of simple construction, can be readily and cheaply applied to gas apparatus already in use, and can be very easily cleaned, while by the construction of the valve and its arrangement in relation to the two passages, the tar and sediment are scraped away from the passages *c* and the mouth of the dip-pipe by the sliding plug when the latter is operated.

The kind of valve which I have here described is that which I prefer and have specified as an element of my second claim; but it will be apparent that the construction of the valve and its arrangement in relation to the passage for the gas without pressure, and the passage for the gas under pressure through the dip-pipe and sealing water, may differ considerably from those which I have described without substantially changing their character as regards the subject-matter of my first claim, which relates to the union of both these passages in one shell, whereby they can both be readily and cheaply introduced into gas apparatus already in use. It will be apparent also that there may be one or several passages in the shell for the escape of gas with pressure and the escape of gas without pressure without departing from the substance of my invention.

What I claim as my invention, and desire to secure by Letters Patent, is—

1. The shell or tube from which the gas passes into the hydraulic main, divided into a passage or passages for the outlet of the gas without pressure, and a passage or passages for the outlet of the gas under pressure, in combination with a valve which may close the former outlet and leave open the latter outlet, substantially as and for the purposes described.

2. The within-described combined valve and dip-pipe, the valve being provided with one or more passages, *c*, through which the gas may pass without pressure from the retort to the hydraulic main when the valve is open, and a plug, D, having an aperture, *b*, which opens a communication between the retort and the hydraulic main through the dip-pipe C when the valve is closed, substantially as and for the purpose described.

Witness my hand this 30th day of January, A. D. 1872.

RUFUS B. CHAPMAN.

Witnesses:
N. AUSTIN PARKS,
J. HENRY TAYLOR.